United States Patent
Dolph et al.

(10) Patent No.: US 10,310,581 B2
(45) Date of Patent: *Jun. 4, 2019

(54) ENHANCED SECURITY AND RESOURCE UTILIZATION IN A MULTI-OPERATING SYSTEM ENVIRONMENT

(71) Applicant: INTERNATIONAL BUSINESS MACHINES CORPORATION, Armonk, NY (US)

(72) Inventors: Blaine H. Dolph, Western Springs, IL (US); Miku K. Jha, New York, NY (US); Sandeep R. Patil, Vimannagar, IN (US); Gandhi Sivakumar, Bentleigh (AU); Riyazahamad M. Shiraguppi, Maharashtra (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/183,972

(22) Filed: Nov. 8, 2018

(65) Prior Publication Data

US 2019/0073016 A1 Mar. 7, 2019

Related U.S. Application Data

(63) Continuation of application No. 15/060,153, filed on Mar. 3, 2016, which is a continuation of application (Continued)

(51) Int. Cl.
*G06F 1/3212* (2019.01)
*G06F 1/3234* (2019.01)
(Continued)

(52) U.S. Cl.
CPC .......... *G06F 1/3212* (2013.01); *G06F 1/3234* (2013.01); *G06F 9/441* (2013.01);
(Continued)

(58) Field of Classification Search
CPC ...... G06F 1/3212; G06F 1/3234; G06F 9/441; G06F 21/57; G06F 21/74; G06F 2221/2111
See application file for complete search history.

(56) References Cited

U.S. PATENT DOCUMENTS 6,985,758 B2 1/2006 Rankin
7,424,601 B2 9/2008 Xu
(Continued)

FOREIGN PATENT DOCUMENTS

EP 2034403 A1 3/2009

OTHER PUBLICATIONS

Intel Corporation; Open and Secure Terminal Initiative (OSTI) Architecture Specification; Oct. 16, 2006; 17 pages.
(Continued)

*Primary Examiner* — Jaweed A Abbaszadeh
*Assistant Examiner* — Gayathri Sampath
(74) *Attorney, Agent, or Firm* — Schmeiser, Olsen & Watts; William H. Hartwell

(57) ABSTRACT

An approach is provided for operating a mobile device having first and second operating systems (OSs) installed. While executing the first OS but not the second OS and based on battery power remaining in the mobile device being less than a threshold and the mobile device consuming less power if executing the second OS but not the first OS, execution of the first OS is terminated and the second OS is executed. While executing the second OS, and in response to a determination of a likelihood of the mobile device being subject to an external security attack in a geographic region in which the mobile device is located and a determination that the mobile device is more secure against the external security attack while executing the first OS than while executing the second OS, execution of the second OS is terminated and the first OS is executed.

4 Claims, 9 Drawing Sheets

Related U.S. Application Data

No. 14/151,278, filed on Jan. 9, 2014, now Pat. No. 9,311,484.

(51) Int. Cl.
  *G06F 21/57* (2013.01)
  *G06F 9/4401* (2018.01)
  *G06F 21/74* (2013.01)

(52) U.S. Cl.
  CPC ............. *G06F 21/57* (2013.01); *G06F 21/74* (2013.01); *G06F 2221/2111* (2013.01)

(56) References Cited

U.S. PATENT DOCUMENTS

| | | |
|---|---|---|
| 7,831,850 B2 | 11/2010 | LeProwse et al. |
| 8,161,299 B2 | 4/2012 | Karkaria |
| 8,239,667 B2 | 8/2012 | Durham |
| 8,312,477 B2 | 11/2012 | Lin |
| 8,478,978 B2 | 7/2013 | Lin |
| 8,983,536 B2 | 3/2015 | Gangam |
| 9,311,484 B2 | 4/2016 | Dolph |
| 2003/0105971 A1 | 6/2003 | Angelo |
| 2005/0278559 A1 | 12/2005 | Sutardja |
| 2006/0031830 A1 | 2/2006 | Chu |
| 2007/0266269 A1* | 11/2007 | Fuchikami ............ G06F 1/3203 713/322 |
| 2009/0089569 A1 | 4/2009 | Baribault |
| 2010/0122077 A1 | 5/2010 | Durham |
| 2010/0313042 A1 | 12/2010 | Shuster |
| 2011/0296212 A1 | 12/2011 | Elnozahy |
| 2012/0102314 A1 | 4/2012 | Zheng |
| 2012/0210150 A1 | 8/2012 | De Lind Van Wijngaarden |
| 2012/0317432 A1 | 12/2012 | Assad |
| 2013/0007245 A1 | 1/2013 | Malik |
| 2013/0024713 A1 | 1/2013 | Bajic |
| 2013/0042295 A1 | 2/2013 | Kelly |
| 2013/0318389 A1* | 11/2013 | Cong ........................ G06F 1/28 713/340 |
| 2015/0193239 A1 | 7/2015 | Dolph |
| 2016/0187956 A1 | 6/2016 | Dolph |

OTHER PUBLICATIONS

Sun et al.; Supporting Multiple OSes with OS Switching; 2007 USENIX Annual Technical Conference; Aug. 29, 2007; pp. 357-362.

Office Action (dated Oct. 27, 2015) for U.S. Appl. No. 14/151,278, filed Jan. 9, 2014; Confirmation No. 6008.

Amendment filed Dec. 14, 2015 in response to Office Action (dated Oct. 27, 2015) for U.S. Appl. No. 14/151,278, filed Jan. 9, 2014; Confirmation No. 6008.

Notice of Allowance (dated Jan. 14, 2016) for U.S. Appl. No. 14/151,278, filed Jan. 9, 2014; Confirmation No. 6008.

Office Action (dated Jan. 10, 2018) for U.S. Appl. No. 15/060,153, filed Mar. 3, 2016; Confirmation No. 5293.

Amendment filed Apr. 10, 2018 in response to Office Action (dated Jan. 10, 2018) for U.S. Appl. No. 15/060,153, filed Mar. 3, 2016; Confirmation No. 5293.

Notice of Allowance (dated Aug. 15, 2018) for U.S. Appl. No. 15/060,153, filed Mar. 3, 2016; Confirmation No. 5293.

* cited by examiner

```
Let AppArr be list of the applications on given OS
Let S be the final sum of weighted values.  S = 0
For each application App1
{
  s = A * batteryUsage of App1
          + B * Quality
          + C * Performance
          + D * Other Resource Utilization
  where A, B, C and D are system defined weights
  S = S + s
}
Return S
```
⎫
⎬ 700
⎭

| Region | Recommended OS List |
|---|---|
| US New York | OS1, OS2, OS3, OS4 |
| US Tuscon | OS1, OS2 |
| US CA | -- |
| North US | OS1 |

*FIG. 8*

ENHANCED SECURITY AND RESOURCE UTILIZATION IN A MULTI-OPERATING SYSTEM ENVIRONMENT

CROSS REFERENCE TO RELATED APPLICATIONS

This application is a continuation application claiming priority to Ser. No. 15/060,153 filed Mar. 3, 2016 which is a continuation application claiming priority to Ser. No. 14/151,278 filed Jan. 9, 2014 now U.S. Pat. No. 9,311,484 issued Apr. 12, 2016.

TECHNICAL FIELD

The present invention relates generally to managing a mobile device in a multi-operating system environment, and more specifically to managing security and battery life of a mobile device in a multi-operating system environment.

BACKGROUND

A mobile operating system (OS) is the operating system that is executed by a mobile device such as a smartphone, tablet, or personal digital assistant (PDA). Existing mobile OSs include Apple® iOS® operating system, Android® offered by Google Inc. located in Mountain View, Calif. and Windows Phone 8® offered by Microsoft Corporation located in Redmond, Wash. Multiple mobile OSs can be installed on the same mobile device at the same time so that features of one installed mobile OS can be provided to the mobile device at one time and other features of another installed mobile OS can be provided at another time. Multiple OSs can execute on the same mobile device through the use of a Virtual Machine Monitor (i.e., hypervisor) or OS switching. OS switching exploits rapid suspend and resume capabilities of OSs to switch between different mobile OSs installed on the same mobile device. One mobile OS being switched out goes through a suspend process to enter a sleep mode, which saves critical portions of the system's state to system memory, but the hardware is not turned off. Instead, OS switching software boots or resumes a different, second mobile OS installed on the mobile device. During the execution of another OS installed on the same mobile device, none of the critical state saved by the first OS is modified. OS switching allows the user to suspend the one mobile OS and its applications and switch to the other mobile OS with the activation of a button, and then return to the one mobile OS with another activation of the button. For example, a user in an office environment prefers one mobile OS that has more security features than another mobile OS and that has integrated utilities such as anti-virus, services including a mail client, and applications including a word processing program, whereas the same user in a home environment prefers the other mobile OS, which has features advantageous to gaming and other entertainment. In response to moving from the office environment to the home environment, the user can switch the mobile device from the one mobile OS to the other mobile OS. Known techniques for OS switching are driven by a selection by the user as to which mobile OS should be manually booted. There is a resistance to a user making the selection of a different mobile OS because a switch of the OS involves time interruption, a change of displays, and a change of applications, thereby creating an unwanted break in the user's flow of activity.

U.S. Patent Application Publication No. 2009/0089569 to Baribault et al. teaches a system that boots an OS or group of OSs in stages to provide a user with rapid access to mobile device features. Available OSs in the mobile device are identified and one of the available OSs is selected for booting in stages. The selection of the OS is done by the user, or according to contextual awareness and policies. The contextual awareness can include location, time-of-day, motion, physiological factors or environmental factors. The stages of the OS are defined to enhance or optimize boot time in accordance with user preferences, user actions, or context.

BRIEF SUMMARY

An embodiment of the present invention is a method, computer system and computer program product for operating a mobile device having first and second operating systems installed on the mobile device. The mobile device consumes more power while executing the first operating system than while executing the second operating system. While the mobile device is executing the first operating system but not the second operating system, one or more processors determines that an amount of battery power remaining in the mobile device is less than a predetermined threshold, and based in part on the remaining battery power in the mobile device and the lower power consumption of the mobile device if executing the second operating system but not the first operating system, the one or more processors terminate execution of the first operating system in the mobile device and execute the second operating system in the mobile device.

Another embodiment of the present invention is a method, computer system and computer program product for operating a mobile device having first and second operating systems installed on the mobile device. The mobile device is less secure while the mobile device executes the first operating system than while the mobile device executes the second operating system. A likelihood of attack on the mobile device is greater in a first geographic region than another geographic region. While the mobile device executes the first operating system, one or more processors determines that the mobile device is currently located in the first geographic region, and based in part on (a) the mobile device being currently located in the first geographic region which has the greater likelihood of attack on the mobile device, and (b) the mobile device being more secure while operating the second operating system but not the first operating system, the one or more processors terminating execution of the first operating system in the mobile device and executing the second operating system in the mobile device.

Embodiments of the present invention provide an intelligent mechanism for guiding a user to switch a mobile device from executing a first mobile OS to a second mobile OS or automatically switching the mobile device from executing a first mobile OS to a second mobile OS to keep the data and applications in the mobile device more secure when the device is in an unsecure location, to maximize the user's duration of activity on the mobile device based on a remaining amount of battery power, and/or to make better features available to the user at a given time based on the user's previous behavioral pattern of accessing features provided by the mobile device.

BRIEF DESCRIPTION OF THE DRAWINGS

FIG. 7 depicts an algorithm used in the process of FIG. 6, in accordance with embodiments of the present invention.

FIG. 8 is a table that includes examples of location information used in the process of FIG. 3, in accordance with embodiments of the present invention.

DETAILED DESCRIPTION

Overview

Embodiments of the present invention provide a mobile OS switching technique in a multi-OS mobile environment such that a mobile device automatically switches from executing a first mobile OS but not executing a second mobile OS to executing the second mobile OS but not executing the first mobile OS, based on various factors. Alternatively, a recommendation for the switch from executing the first mobile OS to executing the second mobile OS is generated based on the various factors and presented to a user of the mobile device. The automatic mobile OS switch or the recommendation for the OS switch can be based on which operating system provides an appropriate amount of security for a geographic region in which the mobile device is currently located, an amount of battery power remaining in the mobile device and different power consumptions of the different operating systems, a previous pattern of the user's access of applications that are executed on the mobile device and which operating system supports each application, or a combination of these factors.

System for Switching a Mobile Device from a First to a Second OS

Figure 1:
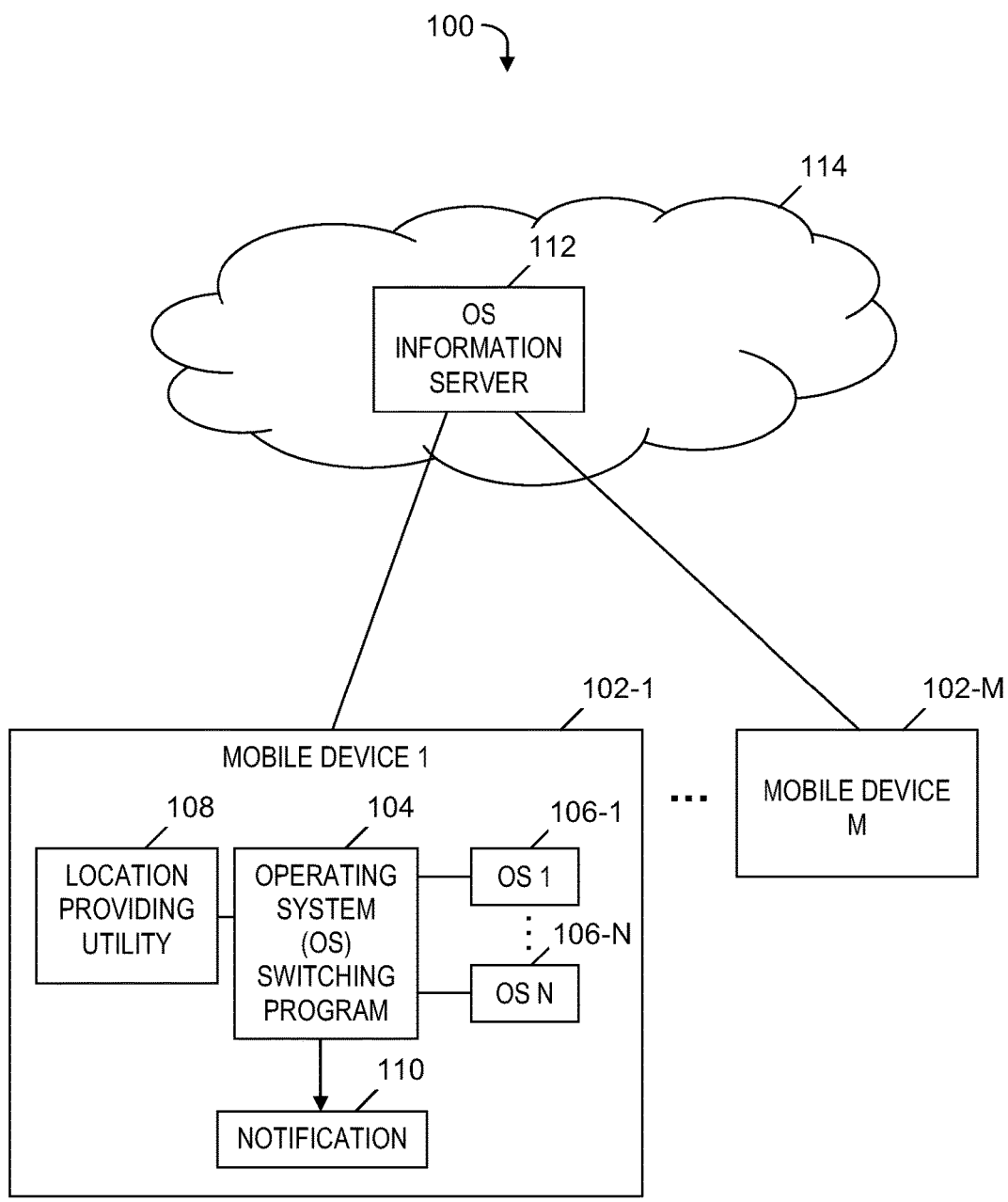
FIG. 1 is a block diagram of a system for switching a mobile device from executing a first OS to executing a second OS, in accordance with embodiments of the present invention.

FIG. 1 is a block diagram of a system 100 for switching a mobile device from executing a first OS to executing a second OS, in accordance with embodiments of the present invention. System 100 includes M mobile devices 102-1 ... 102-M, where M is an integer greater than or equal to one and N is an integer greater than one. Each of the mobile devices 102-1 ... 102-M has a corresponding plurality of different OSs installed therein, including N different operating systems OS 1 ... OS N (i.e., OS 106-1 ... OS 106-N), which are installed on mobile device 102-1. Each of the M mobile devices 102-1 ... 102-M can be a smartphone, tablet computer, PDA, or another portable computing device.

Mobile device 102-1 includes a central processing unit (CPU) (not shown), tangible data storage device(s) (not shown) and a memory (not shown). Mobile device 102-1 utilizes the CPU to execute a software-based OS switching program 104 (i.e., computer program instructions) stored in the tangible storage device(s) via the memory to determine whether to automatically switch mobile device 102-1 from executing a first OS included in OS 106-1 ... OS 106-N to executing a second OS included in OS 106-1 ... OS 106-N, where the first and second OSs are different operating systems. The determination by program 104 of whether to automatically switch mobile device 102-1 (see FIG. 1) from executing the first OS to executing the second OS can be based in whole or in part on the geographic region in which mobile device 102-1 is located, whether the geographic region is known to be unsecure (i.e., a region in which the risk to the mobile device of an external security attack, hacking, software damage, data theft, or data loss is significant), and whether the security level of the second OS is higher than the security level of the first OS (i.e., the second OS has more integrated security features than the first OS to protect against external security attack, hacking, software damage, data theft or data loss). Switching a mobile device from executing a first OS to executing a second OS is also referred to herein more simply as switching the mobile device from a first OS to a second OS.

OS switching program 104 determines the geographic region in which mobile device 102-1 is located by receiving a location of mobile device 102-1 from a software-based location providing utility 108 (e.g., a global positioning system (GPS)-based utility). Mobile device 102-1 utilizes the CPU to execute location providing utility 108 stored in the tangible storage device(s) via the memory to determine the location of the mobile device 102-1. In one embodiment, the location received from location providing utility 108 are latitude and longitude coordinates.

The determination by program 104 of whether to automatically switch from the first OS to the second OS can be based in whole or in part on the remaining amount of battery power for mobile device 102-1, and whether the battery usage rate of mobile device 102-1 while executing the first OS is more than the battery usage rate of mobile device 102-1 while executing the second OS (i.e., whether the mobile device 102-1 consumes more power while executing the first OS than while executing the second OS).

The determination by program 104 of whether to automatically switch from the first OS to the second OS can be based in part on a regular time interval associated with a user's access of application(s) executed on mobile device 102-1, whether the current time is close to the regular time interval, and whether the second OS provides the application(s) with better quality, performance, and/or resource utilization than the first OS.

Prior to or instead of an automatic switch of mobile device 102-1 from the first OS to the second OS, OS switching program generates a notification 110 that recommends to the user the switch from the first OS to the second OS, alerts the user to switch from the first OS to the second OS within a time duration, or alerts the user to turn mobile device 102-1 off.

Each of the OSs in OS 102-1 . . . OS 102-M other than OS 102-1 includes the same structure and provide the same functionality as OS 102-1.

Mobile devices 102-1 . . . 102-M are in communication with an OS information server 112 residing in the cloud 114. OS information server 112 maintains a location map table (not shown) that associates geographic regions with respective lists of recommended OS(s). OS information server 112 also maintains an application parameter table in which each row associates an application and operating system with respective indicators that include measurements and/or score values that indicate battery usage rates, application quality, application performance, and other resource utilization associated with an execution of the application on the mobile device 102-1 (see FIG. 1) while the mobile device 102-1 (see FIG. 1) executes the OS. OS switching program 104 maintains a user application access information table (not shown) in which each row associates application(s) to a time interval, which includes start and end times of an access of the application(s) on mobile device 102-1 (see FIG. 1), and also associates the application(s) to an indication of the pattern of how the access of the application during the time interval is repeated (e.g., daily, weekly on Saturday, or on Monday and Wednesday).

Internal and external components of mobile device 102-1 are further described below relative to FIG. 11. The functionality of components of system 100 is further described below in the discussion relative to FIG. 2, FIG. 3, FIG. 4, FIG. 5, and FIG. 6.

Figure 2:
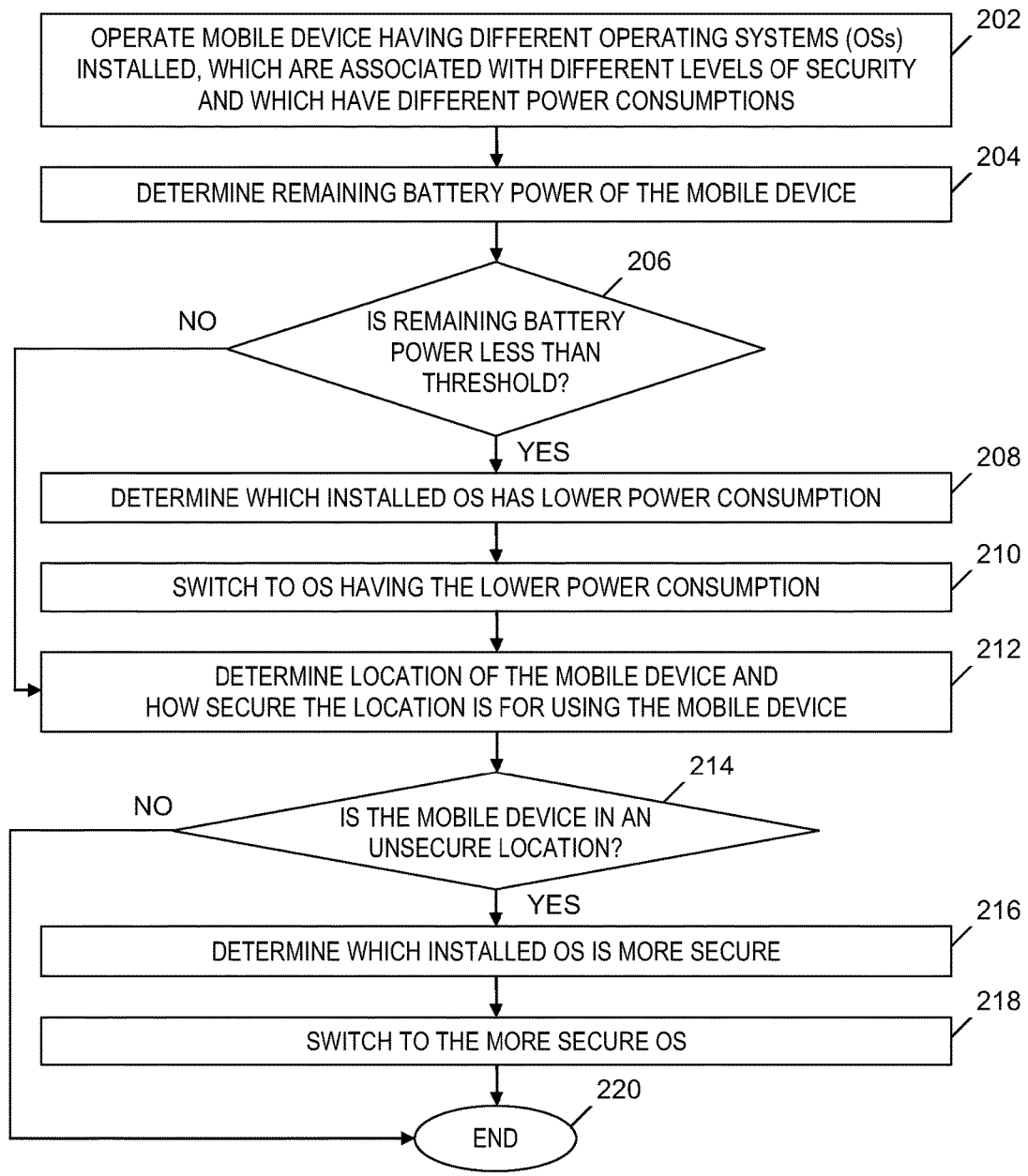
FIG. 2 is a flowchart of an OS switching program executed in a mobile device included in the system of FIG. 1, in accordance with embodiments of the present invention.

FIG. 2 is a flowchart of an OS switching program executed in a mobile device included in the system of FIG. 1, in accordance with embodiments of the present invention. In step 202, mobile device 102-1 (see FIG. 1) is being operated by a user, has different OSs 106-1 . . . 106-N (see FIG. 1) installed, and is executing OS 106-1 but is not executing any other OS. The different OSs 106-1 . . . 106-N have different corresponding levels of security and are associated with different battery usage rates (i.e., power consumptions) for mobile device 102-1 (see FIG. 1) (e.g., mobile device 102-1 (see FIG. 1) consumes more power while executing a first OS that while executing a second OS).

In step 204, OS switching program 104 (see FIG. 1) determines the remaining amount of battery power in mobile device 102-1 (see FIG. 1).

In step 206, OS switching program 104 (see FIG. 1) determines whether the remaining amount of battery power determined in step 204 is less than a threshold which was defined and received by mobile device 102-1 (see FIG. 1) prior to step 206. If OS switching program 104 (see FIG. 1) determines in step 206 that the remaining amount of battery power is less than the threshold, then the Yes branch of step 206 is taken and step 208 is performed.

In step 208, OS switching program 104 (see FIG. 1) determines which of the installed OSs 106-1 . . . 106-N (see FIG. 1) is associated with a lower battery usage rate or lower power consumption than the battery usage rate or power consumption associated with OS 106-1 (see FIG. 1) (i.e., mobile device 106-1 (see FIG. 1) consumes less power while executing another OS installed in the mobile device than while executing OS 106-1 (see FIG. 1)).

In step 210, OS switching program 104 (see FIG. 1) switches mobile device 102-1 (see FIG. 1) from OS 106-1 (see FIG. 1) to the OS determined in step 208, which is associated with a lower battery usage rate than the battery usage rate associated with OS 106-1 (see FIG. 1). Step 210 includes OS switching program 104 (see FIG. 1) terminating execution of OS 106-1 (see FIG. 1) in mobile device 102-1 (see FIG. 1) and executing in mobile device 102-1 (see FIG. 1) the OS determined in step 208.

In one embodiment, step 210 includes OS switching program 104 (see FIG. 1) closing all open applications that are executing on the currently executing OS 106-1 (see FIG. 1) prior to terminating execution of OS 106-1 (see FIG. 1) and initiating execution of the OS determined in step 208.

In step 212, OS switching program 104 (see FIG. 1) determines the geographic region in which the mobile device 102-1 (see FIG. 1) is located by receiving the location coordinates of mobile device 102-1 (see FIG. 1) from location providing utility 108 (see FIG. 1). In step 212, OS switching program 104 (see FIG. 1) also determines how secure the geographic region is for using mobile device 102-1 (see FIG. 1) (i.e., looks up in a table an indication of the likelihood of an attack on the mobile device 102-1 (see FIG. 1), where the attack may be an external security attack or hacking, which results in software damage, data theft, or data loss in the mobile device 102-1 (see FIG. 1), where the table associates the indication with the geographic region determined in step 212). In one embodiment, the geographic region is a country and the level of security of the country is specified by a likelihood that a mobile device will be hacked in the country and/or a level of protection that exists in the country against attacks on mobile devices, which can include a level of strictness of cyber security laws of the country.

In step 214, OS switching program 104 (see FIG. 1) determines whether the geographic region of mobile device 102-1 (see FIG. 1) is an unsecure region (i.e., the table associates the geographic region with an indication that the likelihood is substantially high of the mobile device 102-1 (see FIG. 1) being attacked via an external security attack or hacking, which results in software damage, data theft, or data loss in mobile device 102-1 (see FIG. 1)). If OS switching program 104 (see FIG. 1) determines in step 214 that mobile device 102-1 (see FIG. 1) is in an unsecure region, then the Yes branch of step 214 is taken and step 216 is performed.

In step 216, OS switching program 104 (see FIG. 1) determines which of the installed OSs 106-1 . . . 106-N (see FIG. 1) is more secure than the currently executing OS (e.g., OS 106-1 (see FIG. 1)) (i.e., looks up in a table that an OS that is more secure than the currently executing OS is associated with the geographic region determined in step 212, where the more secure OS has a security level that indicates the OS has sufficient security features whereby the mobile device 102-1 (see FIG. 1) executing the more secure OS can be safely operated in an unsecure region so that the risk of mobile device 102-1 (see FIG. 1) experiencing an external security attack, hacking, software damage, data theft, or data loss is decreased or prevented.

In step 218, OS switching program 104 (see FIG. 1) switches mobile device 102-1 (see FIG. 1) from the currently executing OS (e.g., OS 106-1) to the OS determined in step 216, which is more secure than the currently executing OS. Step 218 includes OS switching program 104 (see FIG. 1) terminating execution of the currently executing OS in mobile device 102-1 (see FIG. 1) and executing in mobile device 102-1 (see FIG. 1) the OS determined in step 216. Following step 218, the process of FIG. 2 ends at step 220.

Returning to step 206, if OS switching program 104 (see FIG. 1) determines that the remaining amount of battery power is not less than the threshold, then the No branch of step 206 is taken, and step 212 is performed, as described above.

Returning to step 214, if OS switching program 104 (see FIG. 1) determines that mobile device 102-1 (see FIG. 1) is not in an unsecure region (i.e., determines that mobile device 102-1 (see FIG. 1) is in a secure region in which the likelihood of an attack on the mobile device is substantially low), then the No branch of step 214 is taken and the process of FIG. 2 ends at step 220.

In one embodiment, steps 214-218 are performed prior to steps 204-212. In another embodiment, OS switching program 104 (see FIG. 1) performs steps 202, 204, 206, 208, 210, and step 220, which follows step 210, without performing steps 212, 214, 216 and 218 (i.e., switches mobile device 102-1 (see FIG. 1) from a first OS to a second OS based on the amount of battery power remaining in the mobile device, but not based on the mobile device being in an unsecure region). In yet another embodiment, OS switching program 104 (see FIG. 1) performs steps 202, 212, 214, 216, 218 and 220, where step 212 follows step 202, without performing steps 204, 206, 208 and 210 (i.e., switches mobile device 102-1 (see FIG. 1) from a first OS to a second OS based on the mobile device being in an unsecure region, but not based on the amount of battery power remaining in the mobile device).

Figure 3:
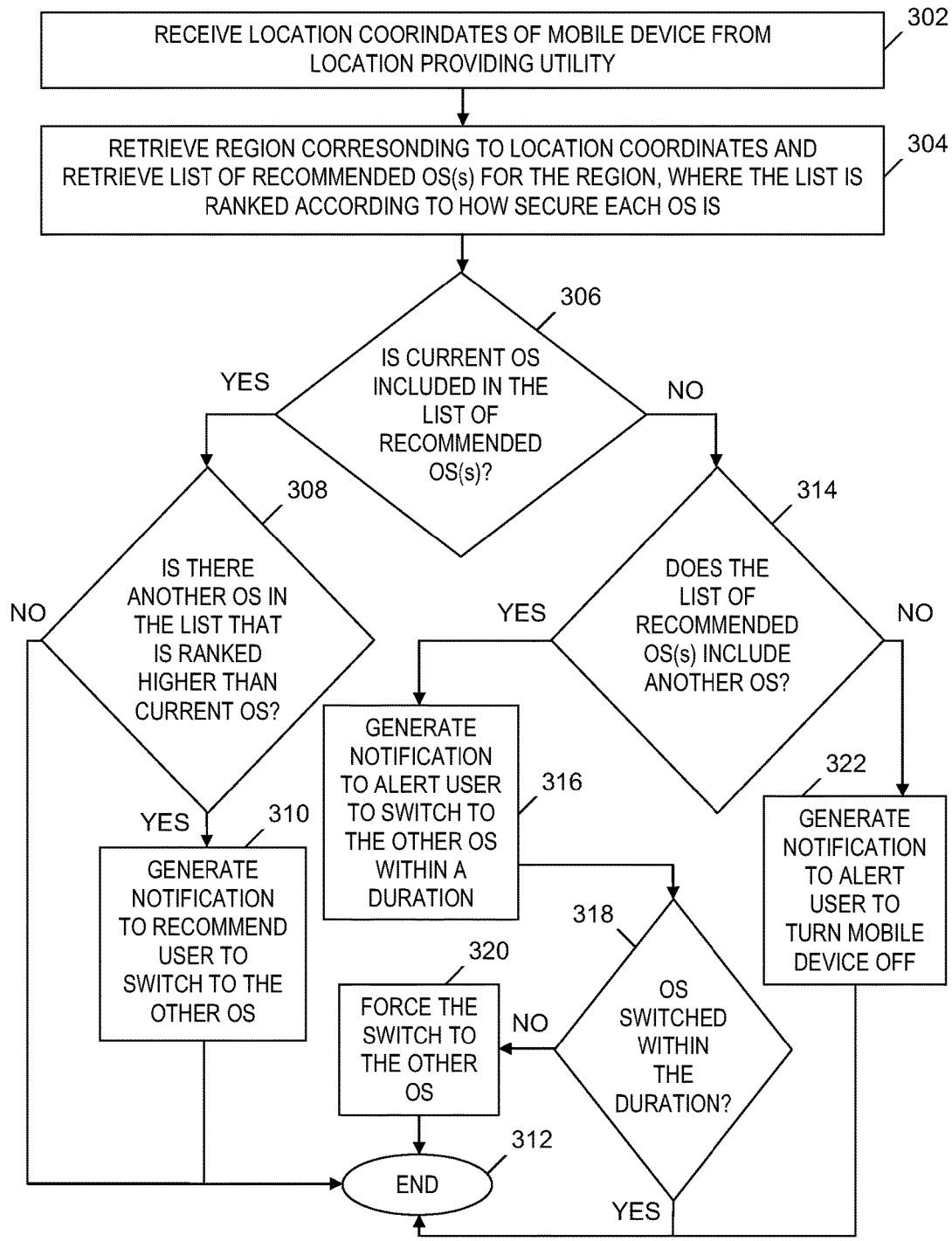
FIG. 3 is a flowchart of a process for switching a mobile device in the system of FIG. 1 from executing a first OS to executing a second OS based on the security of the geographic region in which the mobile device is located, in accordance with embodiments of the present invention.

FIG. 3 is a flowchart of a process for switching a mobile device in the system of FIG. 1 from a first OS to a second OS based on the security of the geographic region of the mobile device, in accordance with embodiments of the present invention. In step 302, OS switching program 104 (see FIG. 1) receives location coordinates of mobile device 102-1 (see FIG. 1) from location providing utility 108 (see FIG. 1).

In step 304, OS switching program 104 (see FIG. 1) retrieves from a table a geographic region corresponding to the location coordinates received in step 302, and retrieves from a table a list of recommended OSs whose levels of security are sufficient to allow operation of mobile device 102-1 (see FIG. 1) in the region, where the mobile device 102-1 (see FIG. 1) is executing one of the recommended OSs. The list of recommended OSs is ranked according to the level of security of each OS (e.g., the list is in the order of most secure OS to least secure OS).

In step 306, OS switching program 104 (see FIG. 1) determines whether the OS currently executing in mobile device 102-1 (see FIG. 1) is included in the list of recommended OSs retrieved in step 304. If OS switching program 104 (see FIG. 1) determines in step 306 that the currently executing OS is in the list of recommended OSs, then the Yes branch of step 306 is taken and step 308 is performed.

In step 308, OS switching program 104 (see FIG. 1) determines whether there is another OS in the list of recommended OSs retrieved in step 304 that is ranked higher in the aforementioned list than the currently executing OS 106-1 (see FIG. 1). If OS switching program 104 (see FIG. 1) determines in step 308 that there is another OS ranked higher in the list than OS 106-1 (see FIG. 1), then the Yes branch of step 308 is taken and step 310 is performed.

In step 310, OS switching program 104 (see FIG. 1) generates notification 110 (see FIG. 1) which includes a recommendation to a user of mobile device 102-1 (see FIG. 1) to switch mobile device 102 from OS 106-1 (see FIG. 1) to the other OS in the list of recommended OSs that is ranked higher than OS 106-1 (see FIG. 1). The process of FIG. 3 ends at step 312.

Returning to step 308, if OS switching program 104 (see FIG. 1) determines that there is not another OS in the list of recommended OSs that is ranked higher than the currently executing OS 106-1 (see FIG. 1), then the No branch of step 308 is taken and the process of FIG. 3 ends at step 312.

Returning to step 306, if OS switching program 104 (see FIG. 1) determines that the currently executing OS 106-1 (see FIG. 1) is not included in the list of recommended OSs retrieved in step 304, then the No branch of step 306 is taken and step 314 is performed.

In step 314, OS switching program 104 (see FIG. 1) determines whether the list of recommended OSs retrieved in step 304 includes another OS. If OS switching program 104 (see FIG. 1) determines in step 314 that the list of recommended OSs includes another OS, then the Yes branch of step 314 is taken and step 316 is performed.

In step 316, OS switching program 104 (see FIG. 1) generates notification 110 (see FIG. 1) that includes an alert to a user of mobile device 102-1 (see FIG. 1) to switch mobile device 102-1 (see FIG. 1) from OS 106-1 (see FIG. 1) to the other OS determined in step 314 within a predefined duration of time (i.e., the duration is defined and received by OS switching program 104 (see FIG. 1) prior to step 316).

In step 318, OS switching program 104 (see FIG. 1) determines whether mobile device 102-1 (see FIG. 1) switched from OS 106-1 (see FIG. 1) to the other OS determined in step 314 within the predefined duration of time. If OS switching program 104 (see FIG. 1) determines in step 318 that mobile device 102-1 (see FIG. 1) switched to the other OS within the predefined duration of time, then the Yes branch of step 318 is taken and the process of FIG. 3 ends at step 312.

If OS switching program 104 (see FIG. 1) determines in step 318 that mobile device 102-1 (see FIG. 1) did not switch to the other OS within the predefined duration of time, then the No branch of step 318 is taken and step 320 is performed.

In step 320, OS switching program 104 (see FIG. 1) forces an automatic switch of mobile device 102-1 (see FIG. 1) from OS 106-1 (see FIG. 1) to the other OS determined in step 314. Following step 320, the process of FIG. 3 ends at step 312.

Returning to step 314, if OS switching program 104 (see FIG. 1) determines that the list of recommended OSs does not include another OS, then the No branch of step 314 is taken and step 322 is performed.

In step 322, OS switching program 104 (see FIG. 1) generates notification 110 (see FIG. 1), which includes an alert to a user of mobile device 102-1 (see FIG. 1) to turn off mobile device 102-1 (see FIG. 1). Following step 322, the process of FIG. 3 ends at step 312.

In one embodiment, the process of FIG. 3 replaces steps 212, 214, 216, 218 and 220 in the process of FIG. 2.

As one example, OS switching program 104 (see FIG. 1) receives in step 302 the latitude and longitude coordinates of mobile device 102-1 (see FIG. 1) from a GPS utility. The mobile device 102-1 (see FIG. 1) is currently executing OS 1 (i.e., OS 106-1 in FIG. 1). OS switching program 104 (see FIG. 1) looks up the received coordinates in a database table maintained by OS information server 112 (see FIG. 1), and retrieves in step 304 Country X from the database table, based on Country X being associated with the received coordinates in the database table (i.e., the table indicates that the received coordinates are in Country X). Country X is considered to be an unsecure location in which mobile device 102-1 (see FIG. 1) has a substantially high likelihood of being attacked, thereby experiencing software damage, data theft, and/or data loss. Because Country X is an unsecure location, a location map table maintained by OS information server 112 (see FIG. 1) associates a list of operating systems, which includes operating system OS 2, as the only operating systems that can provide protection to mobile device 102-1 (see FIG. 1) from an attack while mobile device 102-1 (see FIG. 1) is in Country X. In this example, OS switching program 104 (see FIG. 1) determines in step 306 that the list of operating systems does not include OS 1 and determines in step 314 that the list includes OS 2. In step 316, OS switching program 104 (see FIG. 1) generates the notification: "Urgent Alert! You are at an unsafe location. Switch to OS 2 in 10 seconds; otherwise the switch will occur automatically."

Figure 4:
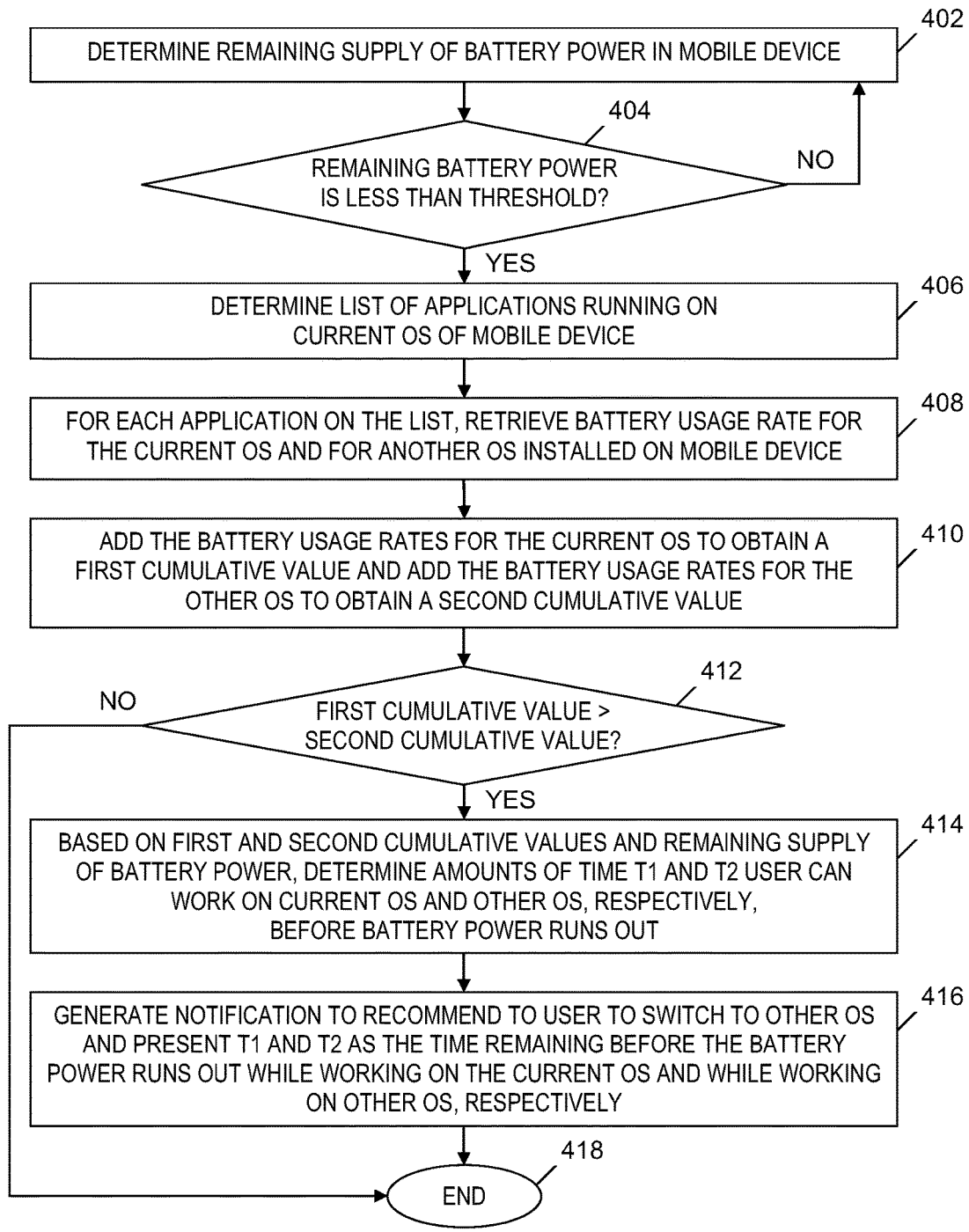
FIG. 4 is a flowchart of a process for switching a mobile device in the system of FIG. 1 from executing a first OS to executing a second OS based on the remaining amount of battery power in the mobile device, in accordance with embodiments of the present invention.

FIG. 4 is a flowchart of a process for switching a mobile device in the system of FIG. 1 from a first OS to a second OS based on the amount of battery power remaining in the mobile device, in accordance with embodiments of the present invention. In step 402, OS switching program 104 (see FIG. 1) determines the remaining amount of battery power of mobile device 102-1 (see FIG. 1).

In step 404, OS switching program 104 (see FIG. 1) determines whether the remaining amount of battery power determined in step 402 is less than a predetermined threshold amount of battery power, where the predetermined threshold is received by OS switching program 104 (see FIG. 1) prior to step 404. If OS switching program 104 (see FIG. 1) determines in step 404 that the remaining amount of battery power is less than the threshold, then the Yes branch of step 404 is taken and step 406 is performed.

In step 406, OS switching program 104 (see FIG. 1) determines a list of applications executing in mobile device 102-1 (see FIG. 1), which is currently executing OS 106-1 (see FIG. 1).

In step 408, for each application on the list determined in step 406, OS switching program 104 (see FIG. 1) retrieves a corresponding battery usage rate associated with the currently executing OS 106-1 (see FIG. 1) and associated with another OS installed on mobile device 102-1 (see FIG. 1) (i.e., associated with a second OS included in OS 106-1 . . . OS 106-N (see FIG. 1) other than OS 106-1 (see FIG. 1)).

In step 410, OS switching program 104 (see FIG. 1) adds the battery usage rates retrieved in step 408 for the currently executing OS 106-1 (see FIG. 1) to obtain a first sum of battery usage rates, and adds the battery usage rates retrieved in step 408 for the other OS installed on mobile device 102-1 (see FIG. 1) to obtain a second sum of battery usage rates.

In step 412, OS switching program 104 (see FIG. 1) determines whether the first sum obtained in step 410 is greater than the second sum obtained in step 410. If OS switching program 104 (see FIG. 1) determines in step 412 that the first sum is greater than the second sum, then the Yes branch of step 412 is taken and step 414 is performed.

In step 414, based on the first and second sums obtained in step 410 and the current amount of battery power remaining in the mobile device 102-1 (see FIG. 1) determined in step 402, OS switching program 104 (see FIG. 1) determines an amount of time T1 that mobile device 102-1 (see FIG. 1) can continue to execute the applications on the list determined in step 406 while continuing to execute OS 106-1 (see FIG. 1) and an amount of time T2 that mobile device 102-1 (see FIG. 1) can execute the applications on the list determined in step 406 while executing the other OS instead of OS 106-1 (see FIG. 1).

In step 416, OS switching program 104 (see FIG. 1) generates notification 110 (see FIG. 1) that includes a recommendation to a user of mobile device 102-1 (see FIG. 1) to switch from OS 106-1 (see FIG. 1) to the other OS, that may include a presentation of T1 and T2 as the amounts of time remaining before the battery power runs out as mobile device 102-1 (see FIG. 1) executes the applications on the aforementioned list while mobile device 102-1 (see FIG. 1) executes OS 106-1 (see FIG. 1) and the other OS, respectively. In one embodiment, the notification generated in step 416 also includes an alert that one or more applications cannot be executed after the mobile device 102-1 (see FIG. 1) switches to executing the other OS.

Following step 416, the process of FIG. 4 ends at step 418.

Returning to step 412, if OS switching program 104 (see FIG. 1) determines that the first sum of battery usage rates obtained in step 410 which are associated with the currently executing OS is not greater than the second sum of battery usage rates obtained in step 410 which are associated with the other OS, then the No branch of step 412 is taken and the process of FIG. 4 ends at step 418.

Returning to step 404, of OS switching program 104 (see FIG. 1) determines that the remaining amount of battery power is not less than the threshold, then the No branch of step 404 is taken and the process loops back to step 402 after a waiting period of time to continue a periodic determination of the remaining amount of battery power in mobile device 102-1 (see FIG. 1).

In one embodiment, the process of FIG. 4 replaces steps 204, 206, 208, and 210 in the process of FIG. 2.

As one example, OS switching program 104 (see FIG. 1) determines in step 402 the amount of battery power remaining in mobile device 102-1 (see FIG. 1). The mobile device 102-1 (see FIG. 1) is currently executing OS 1 (i.e., OS 106-1 in FIG. 1). OS switching program 104 (see FIG. 1) determines in step 404 that the remaining amount of battery power is less than a predefined threshold amount, and determines in step 406 that only Application X is currently running in OS 1 on mobile device 102-1 (see FIG. 1). For Application X, OS switching program 104 (see FIG. 1) determines a first rate of battery usage as Application X is run in OS 1 and a second rate of battery usage as Application X is run in another operating system OS 2. In step 412, OS switching program 104 (see FIG. 1) determines that that the first rate is greater than the second rate. In step 414, based on the first and second battery usage rates, and based on the remaining amount of battery power, OS switching program 104 (see FIG. 1) determines that mobile device 102-1 (see FIG. 1) can run Application X for 10 minutes in the currently executing OS 1 before the battery power runs out, and can run Application X for 30 minutes in OS 2 before the battery power runs out. In step 416, OS switching program generates the notification: "Recommendation: Your remaining battery power is low. You can run your current application for 10 minutes. If you switch to OS 2, you can run your current application for 30 minutes. Note that Application Y is not available on OS 2."

Figure 5:
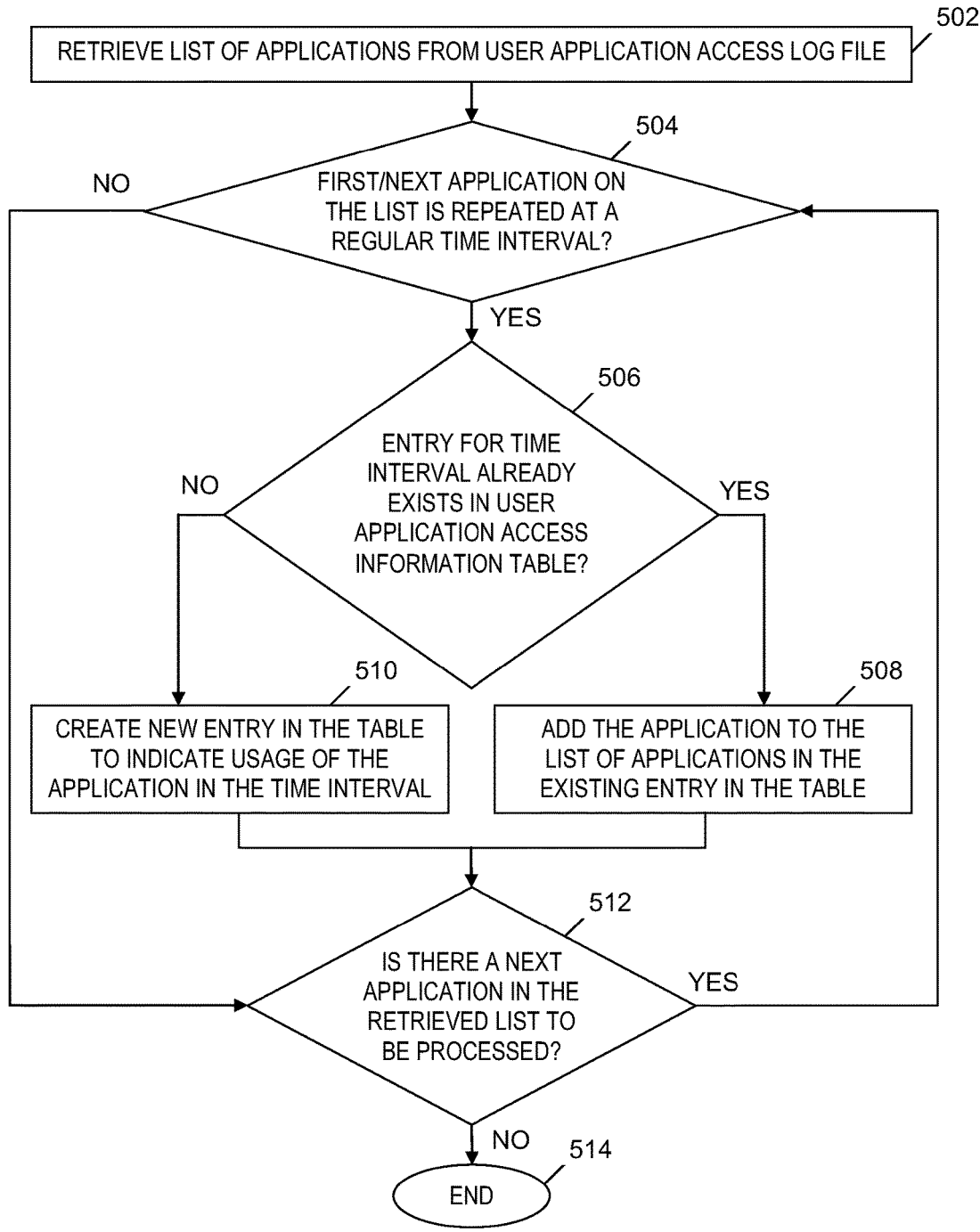
FIG. 5 is a flowchart of a process for updating a user application information table used to switch a mobile device in the system of FIG. 1 from executing a first OS to executing a second OS based on a pattern of user behavior, in accordance with embodiments of the present invention.

FIG. 5 is a flowchart of a process for updating a user application information table used to switch a mobile device in the system of FIG. 1 from a first OS to a second OS based on a pattern of user behavior, in accordance with embodiments of the present invention. In step 502, OS switching program 104 (see FIG. 1) retrieves a list of applications from a log file that logs the applications that are executed by a user who utilizes mobile device 102-1 (see FIG. 1).

In step 504, for the first or next application in the list of applications retrieved in step 502, OS switching program 104 (see FIG. 1) determines whether the application is accessed by the user at a specific time interval that is repeated on a regular basis, such as daily, weekly on a specific day of the week, or on each of multiple specific days of each week. If OS switching program 104 (see FIG. 1) determines in step 504 that the application is accessed by the user at a time interval that is repeated on a regular basis, then the Yes branch of step 504 is taken and step 506 is performed.

In step 506, OS switching program 104 (see FIG. 1) determines whether a user application access information table already has an entry that includes the time interval at which the application is accessed by the user, and if there is an entry in the table, the Yes branch of step 506 is taken and step 508 is performed.

In step 508, OS switching program 104 (see FIG. 1) adds the application to the list of application(s) in the existing entry in the user application access information table.

Returning to step 506, if OS switching program 104 (see FIG. 1) determines that the user application access information table does not have an entry that includes the time interval at which the application is accessed by the user, then the No branch of step 506 is taken and step 510 is performed.

In step 510, OS switching program 104 (see FIG. 1) creates a new entry in the user application access information table to indicate usage of the application in the time interval.

Step 512 follows step 508 and step 510. In step 512, OS switching program 104 (see FIG. 1) determines whether there is a next application in the list of applications retrieved in step 502 that has not yet been processed by step 504. If OS switching program 104 (see FIG. 1) determines in step 512 that there is a next application in the list of applications that has not yet been processed by step 504, then the Yes branch of step 512 is taken and the process loops back to step 504 to process the next application.

If OS switching program 104 (see FIG. 1) determines in step 512 that there is not a next application in the list of applications retrieved in step 502 that has not yet been processed by step 504, then the No branch of step 512 is taken and the process of FIG. 5 ends at step 514.

Returning to step 504, if the user's access of the application on the list retrieved in step 502 is not repeated at a regular time interval, then the No branch of step 504 is taken, and step 512 is performed, as described above.

Figure 6:
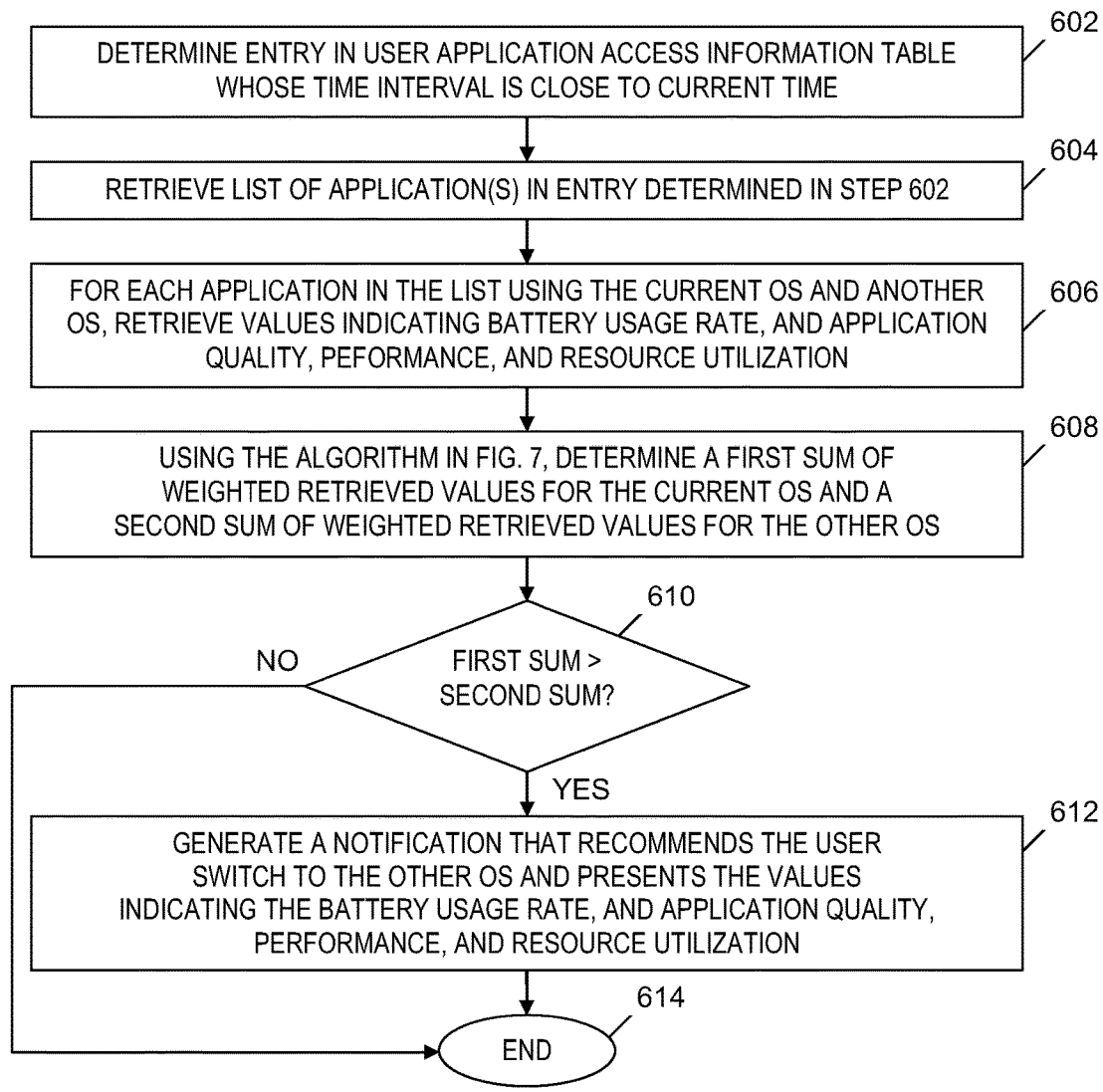
FIG. 6 is a flowchart of a process for switching a mobile device in the system of FIG. 1 from executing a first OS to executing a second OS based on a pattern of user access of applications on the mobile device, in accordance with embodiments of the present invention.

FIG. 6 is a flowchart of a process for switching a mobile device in the system of FIG. 1 from a first OS to a second OS based on a pattern of user access of applications on the mobile device, in accordance with embodiments of the present invention. In step 602, OS switching program 104 (see FIG. 1) determines the current time and determines an entry in the user application access information table whose time interval is close to the current time within a predefined amount of time. The predefined amount of time is defined and received by OS switching program 104 (see FIG. 1) prior to step 602.

In step 604, OS switching program 104 (see FIG. 1) retrieves a list of application(s) in the entry determined in step 602.

In step 606, for each application in the list retrieved in step 604, OS switching program 104 (see FIG. 1) retrieves from a parameter table values indicating battery usage rate (i.e., power consumption), and application quality, performance, and resource optimization for the currently executing OS 106-1 (see FIG. 1) and for another OS installed in mobile device 102-1 (see FIG. 1).

In step 608, using the algorithm depicted in FIG. 7, OS switching program 104 (see FIG. 1) determines a first sum of weighted values for the currently executing OS 106-1 (see FIG. 1) and a second sum of weighted values for the other OS installed in mobile device 102-1 (see FIG. 1), where the values that are weighted are the values retrieved in step 606.

In step 610, OS switching program 104 (see FIG. 1) determines whether the first sum determined in step 608 is greater than the second sum determined in step 610, and if the first sum is determined to be greater than the second sum, then the Yes branch of step 610 is taken and step 612 is performed.

In step 612, OS switching program 104 (see FIG. 1) generates notification 110 (see FIG. 1) that includes a recommendation to a user of mobile device 102-1 (see FIG. 1) to switch the mobile device from OS 106-1 (see FIG. 1) to the other OS, and that may include a presentation to the user of the values indicating the battery usage rate, and application quality, performance, and resource optimization. Following step 612, the process of FIG. 6 ends at step 614.

Returning to step 610, if OS switching program 104 (see FIG. 1) determines that the first sum determined in step 608 is not greater than the second sum determined in step 608, then the No branch of step 610 is taken and the process of FIG. 6 ends at step 614.

As one example, OS switching program 104 (see FIG. 1) determines in step 602 an entry in a user application access information table whose time interval of 5:00 PM to 6:00 PM is close to the current time of 4:55 PM. The mobile device 102-1 (see FIG. 1) is currently executing OS 1 (i.e., OS 106-1 in FIG. 1). OS switching program 104 (see FIG. 1) retrieves a list including only Application X, which is a music player application, where the list is included in the entry determined in step 602. The user application access information table indicates that the user of mobile device 102-1 (see FIG. 1) uses Application X in the time interval of 5:00 PM to 6:00 PM on a daily basis. From an application parameter table maintained by OS information server 112 (see FIG. 1), OS switching program 104 (see FIG. 1) retrieves in step 606 first values indicating battery usage rate, quality of Application X, performance of application X, and other resource utilization when running Application X in OS 1, and second values indicating battery usage rate, quality of Application X, performance of Application X, and other resource utilization when running Application X in OS 2. In this example, the battery usage rates, performance and other resource utilization rates are substantially the same for Application X running in OS 1 versus OS 2, but the quality of Application X is substantially better when executing Application X in OS 2 versus OS 1. In step 608, OS switching program 104 (see FIG. 1) applies the retrieved first values to the algorithm in FIG. 7 to determine a first sum of weighted values for Application X running on OS 1 and applies the retrieved second values to the algorithm in FIG. 7 to determines a second sum of weighted values for Application X running on OS 2. In step 610, OS switching program 104 (see FIG. 1) determines the first sum is greater than the second sum. The first sum is greater than the second sum because of the quality of Application X being substantially better when executing Application X in OS 2 versus OS 1. In step 612, based on the first sum being greater than the second sum, OS switching program 104 (see FIG. 1) generates the notification: "Guideline: Per your usage patterns, you are going to start playing music in 5 minutes. If you switch to OS 2 from the currently running OS 1, you will be able to play music at a higher quality."

FIG. 7 depicts an algorithm 700 used in the process of FIG. 6, in accordance with embodiments of the present invention. Algorithm 700 includes initializing S, the final sum of weighted values, to be zero. For each application App1 in the list of applications using a given OS, four weighted values are added together to generate an intermediate sum (i.e., "s" in FIG. 7) and the intermediate sum is added to the final sum S. The four weighted values are a first weighted value indicating the battery usage rate of App1 using the OS (i.e., A*batteryUsage of App1 in FIG. 7), a second weighted value indicating the quality of App1 using the OS (i.e., B*Quality in FIG. 7), a third weighted value indicating the performance of App1 using the OS (i.e., C*Performance in FIG. 7), and a fourth weighted value indicating the performance of App1 using the OS (i.e., D*other resource utilization in FIG. 7). Each of the weights A, B, C and D may be a positive or a negative number. In one embodiment, A and D are negative numbers while B and C are positive numbers.

The given OS in algorithm 700 is the OS currently being executed in mobile device 102-1 (see FIG. 1) or another OS installed on mobile device 102-1 (see FIG. 1). In one embodiment, algorithm 700 is used twice in step 608 in FIG. 6, once to determine S as the first sum of weighted values for the OS currently executing on mobile device 102-1 (see FIG. 1), and again to determine S as the second sum of the weighted values for the other OS installed on mobile device 102-1 (see FIG. 1). In one embodiment, weights A, B, C and D are predefined values stored in a data repository coupled to OS information server 112 (see FIG. 1) and received by OS switching program 104 (see FIG. 1) from OS information server 112 (see FIG. 1) prior to step 608 in FIG. 6.

FIG. 8 is a table 800 that includes examples of location information used in the process of FIG. 3, in accordance with embodiments of the present invention. Table 800 is a location map table that includes geographic regions associated with respective lists of recommended OS(s). An OS is included in the list of recommended OS(s) for a specific geographic region are based on the type of security features provided by the OS and based on the likelihood of an attack via an external security attack or hacking of mobile device 102-1 (see FIG. 1) while mobile device 102-1 (see FIG. 1) is in the corresponding geographic region. If a geographic region is known to have a substantially high likelihood of an attack on a mobile device operating in the region, then only OS(s) that provide security features that protect against such attacks are included in the list of recommended OS(s) in table 800.

In one embodiment, table 800 is stored in a data repository maintained by OS information server 112 (see FIG. 1). Table 800 and can be updated by an administrator of cloud 114 (see FIG. 1). In one embodiment, table 800 is maintained by OS information server 112 (see FIG. 1) so that each list of recommended OSs is in descending order of the security level provided by the OS. For example, the list of OS1, OS2, OS3, OS4 in the first row of table 800 indicates that OS1 has the highest security level of the OSs in the list (i.e., provides security features that protect mobile device 102-1 (see FIG. 1) from attack better than the other OSs in the list), OS2 has the second highest security level of the OSs in the list, OS3 has the third highest security level of the OSs in the list, and OS4 has the lowest security level of the OSs in the list.

In one embodiment, step 304 (see FIG. 3) retrieves the list of recommended OSs for a geographic region by looking up the region in table 800 and retrieving the list of recommended OSs in the entry that includes the region.

Figure 9:
FIG. 9 is a table that includes examples of application parameters used in the algorithm of FIG. 7, in accordance with embodiments of the present invention.

FIG. 9 is a table 900 that includes examples of application parameters used in the algorithm of FIG. 7, in accordance with embodiments of the present invention. Table 900 is an application parameter table where each row of table 900 includes a set of indicators which are measurements and/or score values that indicate battery power consumption of an application executing on mobile device 102-1 (see FIG. 1) while the mobile device executes a specific OS, quality of the application, performance of the application, and other resource utilization of the application. The battery power consumption indicator can be a value of units of battery power consumed per minute. Quality, performance and resource utilization values in table 900 can be scores in a predefined range (e.g., a range of scores from 0 to 5, where 0 indicates the minimum quality, performance or resource utilization, and 5 indicates the maximum quality, performance or resource utilization).

For example, the first row of table 900 includes a set of the aforementioned indicators for application App 1 executing on mobile device 102-1 (see FIG. 1) while the mobile device executes operating system OS1; the second row includes a set of the indicators for application App 1 executing on mobile device 102-1 (see FIG. 1) while the mobile device executes operating system OS2; the third row includes a set of the indicators for application App 2 executing on the mobile device while the mobile device executes operating system OS 1; and the fourth row includes a set of the indicators for application App 2 executing on the mobile device while the mobile device executes operating system OS 2.

In one embodiment, table 900 is stored in a data repository maintained by OS information server 112 (see FIG. 1). Table 900 and can be updated by an administrator of cloud 114 (see FIG. 1).

In one embodiment, in step 608 (see FIG. 6), OS switching program 104 (see FIG. 1) receives from OS information server 112 (see FIG. 1) the indicators of battery power consumption, application quality, application performance, application performance, and other application utilization, which are retrieved by OS information server 112 (see FIG. 1) from table 900. In step 608 (see FIG. 6), OS switching program 104 (see FIG. 1) uses the received indicators as values in algorithm 700 (see FIG. 7): the battery power consumption indicator is used as the value of batteryUsage; the application quality indicator is used as the value of Quality; the application performance indicator is used as the value of Performance; and the other resource utilization indicator is used as the value of Other Resource Utilization.

Figure 10:
FIG. 10 is a table that includes examples of data specifying patterns of user access of applications used in the process of FIG. 6, in accordance with embodiments of the present invention.

FIG. 10 is a table 1000 that includes examples of data specifying patterns of user access of applications used in the process of FIG. 6, in accordance with embodiments of the present invention. Table 1000 is an application access information table where each row of table 1000 includes start and end time of a time interval, a list of application(s) that are regularly executed by a user utilizing mobile device 102-1 (see FIG. 1) in the time interval, and an indicator of what basis the time interval is repeated (e.g., daily, weekly on a specific day of the week, weekly on specific multiple days of the week, etc.).

For example, the first row of table 1000 indicates that a user of mobile device 102-1 (see FIG. 1) executes App1 (i.e., a Caller application) on the mobile device in the time interval of 10:00 AM to 11:00 AM and this pattern of usage of App1 repeats on a daily basis. This pattern of usage may result from the user utilizing mobile device 102-1 (see FIG.

1) to participate in a daily conference call from 10:00 AM to 11:00 AM. As another example, the second row of table 1000 indicates that the user executes App2 (i.e., a music player) daily in the time interval from 5:00 PM to 6:00 PM because the user is has a daily pattern of behavior of driving home and listening to music during the aforementioned time interval. As yet another example, the third row of table 1000 indicates the user has exhibited a pattern of executing App3 (i.e., a game) from 6:00 PM to 9:00 PM on Saturday of each week.

In one embodiment, table 1000 is stored in a data repository maintained by OS switching program 104 (see FIG. 1), where the data repository is coupled to mobile device 102-1 (see FIG. 1).

In one embodiment, the process of FIG. 5 updates table 1000 by creating a new entry or by adding an application to the list of applications in an existing entry. In one embodiment, step 602 (see FIG. 6) determines an entry in table 1000 so that the time interval in the entry is close to the current time (i.e., the time interval and the current time are within a predefined amount of time) and step 604 (see FIG. 6) retrieves a list of application(s) from table 1000, where the list is in the entry determined in step 602 (see FIG. 6).

Computer System

Figure 11:
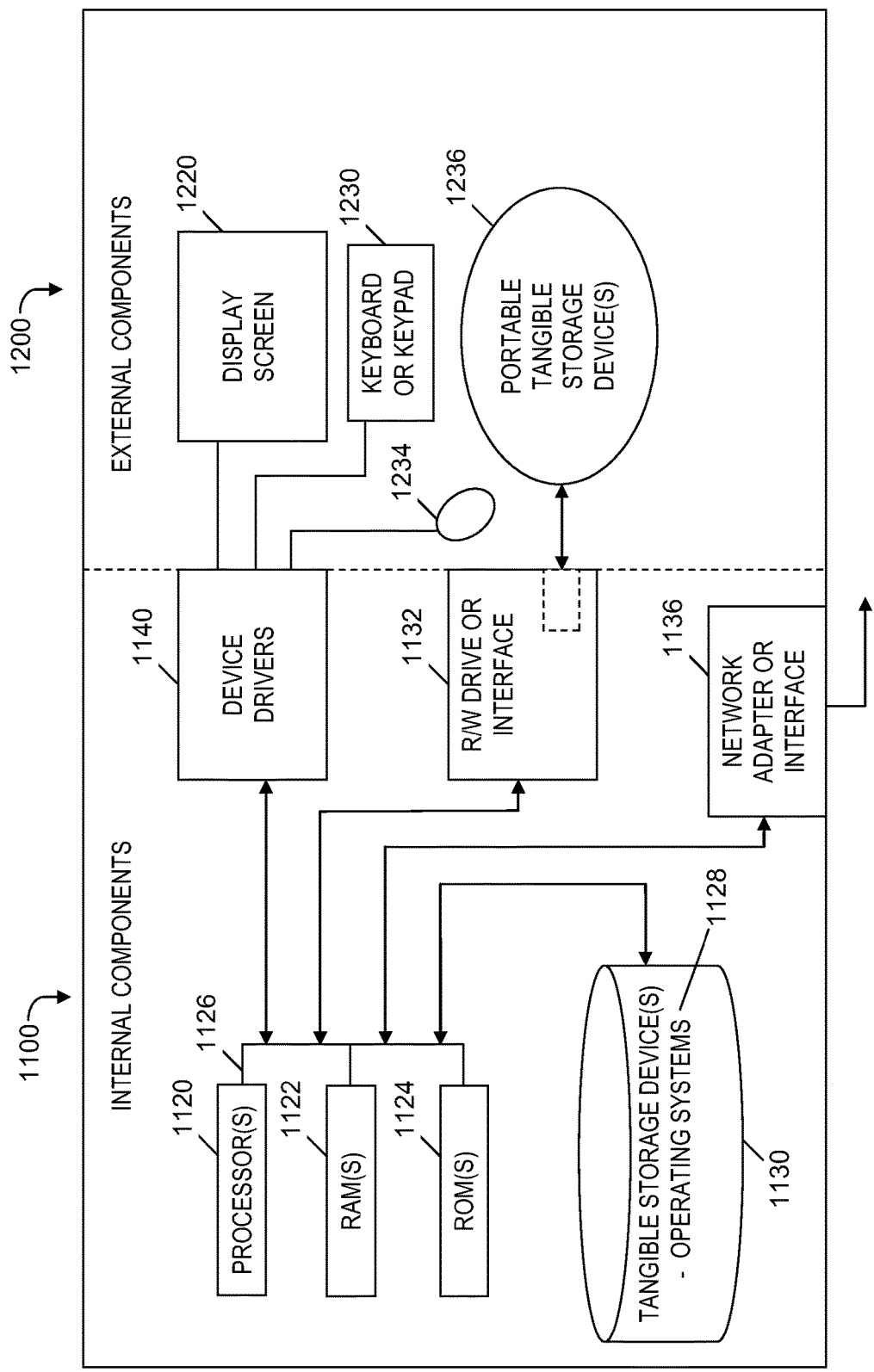
FIG. 11 is a block diagram of components of a mobile device included in the system of FIG. 1 for switching the mobile device from executing a first OS to executing a second OS, in accordance with embodiments of the present invention.

FIG. 11 is a block diagram of components of a mobile device included in the system of FIG. 1 for switching a mobile device from executing a first OS to executing a second OS, in accordance with embodiments of the present invention. Mobile device 102-1 (see FIG. 1) includes sets of internal components 1100 and external components 1200 illustrated in FIG. 11. The set of internal components 1100 includes one or more processors 1120, one or more computer-readable random access memories (RAMs) 1122 and one or more computer-readable read-only memories (ROMs) 1124 on one or more buses 1126, a plurality of mobile operating systems 1128 and one or more computer-readable storage devices 1130. The operating systems 1128 and program instructions 104 (for mobile device 102-1 in FIG. 1) are stored on one or more of the respective computer-readable storage devices 1130 for execution by one or more of the respective processors 1120 via one or more of the respective RAMs 1122 (which typically include cache memory). In the illustrated embodiment, each of the computer-readable storage devices 1130 is a magnetic disk storage device of an internal hard drive. Alternatively, each of the computer-readable storage devices 1130 is a semiconductor storage device such as ROM 1124, erasable programmable read-only memory (EPROM), flash memory or any other computer-readable storage device that can store but does not transmit a computer program and digital information.

The set of internal components 1100 also includes a read/write (R/W) drive or interface 1132 to read from and write to one or more portable tangible computer-readable storage devices 1236 that can store but do not transmit a computer program, such as a CD-ROM, DVD, memory stick, magnetic tape, magnetic disk, optical disk or semiconductor storage device. The program instructions 104 (for mobile device 102-1 in FIG. 1) can be stored on one or more of the respective portable tangible computer-readable storage devices 1236, read via the respective R/W drive or interface 1132 and loaded into the respective hard drive or semiconductor storage device 1130. The terms "computer-readable storage device" and "computer-readable storage devices" do not mean signal propagation media such as copper cables, optical fibers and wireless transmission media.

The set of internal components 1100 also includes a network adapter or interface 1136 such as a transmission control protocol/Internet protocol (TCP/IP) adapter card or wireless communication adapter (such as a 4G wireless communication adapter using orthogonal frequency-division multiple access (OFDMA) technology). The program 104 (for mobile device 102-1 in FIG. 1) can be downloaded to mobile device 102-1 (see FIG. 1) from an external computer or external computer-readable storage device via a network (for example, the Internet, a local area network or other, wide area network or wireless network) and network adapter or interface 1136. From the network adapter or interface 1136, the program 104 (see FIG. 1) is loaded into the respective hard drive or semiconductor storage device 1130. The network may comprise copper wires, optical fibers, wireless transmission, routers, firewalls, switches, gateway computers and/or edge servers.

The set of external components 1200 includes a display screen 1220, a keyboard or keypad 1230, and a computer mouse or touchpad 1234. The set of internal components 1100 also includes device drivers 1140 to interface to display screen 1220 for imaging, to keyboard or keypad 1230, to computer mouse or touchpad 1234, and/or to the display screen for pressure sensing of alphanumeric character entry and user selections. The device drivers 1140, R/W drive or interface 1132 and network adapter or interface 1136 comprise hardware and software (stored in storage device 1130 and/or ROM 1124.

The program 104 (see FIG. 1) can be written in various programming languages (such as C++) including low-level, high-level, object-oriented or non-object-oriented languages. Alternatively, the functions of program 104 (see FIG. 1) can be implemented in whole or in part by computer circuits and other hardware (not shown).

Based on the foregoing, a computer system, method and program product have been disclosed for operating a mobile device having first and second operating systems installed on the mobile device. However, numerous modifications and substitutions can be made without deviating from the scope of the present invention. Therefore, the present invention has been disclosed by way of example and not limitation.

What is claimed is:

1. A computer system comprising:
one or more processors;
a memory coupled to the one or more processors; and
a computer readable storage medium coupled to the one or more processors, the computer readable storage medium containing instructions that are executed by the one or more processors via the memory to implement a method of operating a mobile device having first and second operating systems installed on the mobile device, the method comprising the steps of:
while the mobile device is executing the first operating system but not the second operating system, determining, by the one or more processors, that an amount of battery power remaining in the mobile device is less than a predetermined threshold;
determining, by the one or more processors, applications being executed on the mobile device while the mobile device executes the first operating system;
retrieving from a table in a data repository, by the one or more processors, first rates of the applications using the battery power of the mobile device based on the applications being executed on the mobile device while the mobile device executes the first operating system;

retrieving from the table in the data repository, by the one or more processors, second rates of the applications using the battery power of the mobile device based on the applications being executed on the mobile device while the mobile device executes the second operating system;

generating, by the one or more processors, first and second sums by adding the first rates together and by adding the second rates together, respectively;

determining, by the one or more processors, the first sum is greater than the second sum; and based on the remaining battery power in the mobile device being less than the predetermined threshold and based on the first sum being greater than the second sum, the one or more processors terminating execution of the first operating system in the mobile device and executing the second operating system in the mobile device.

2. The computer system of claim 1, wherein the method further comprises the steps of:

based on the first and second sums and based on the amount of battery power remaining in the mobile device, determining, by the one or more processors, first and second amounts of time the mobile device can execute the applications before the battery power runs out while the mobile device executes the first operating system but not the second operating system and while the mobile device executes the second operating system but not the first operating system, respectively; and based on the first sum being greater than the second sum, generating, by the one or more processors, a notification to a user of the mobile device, the notification including a recommendation to perform the steps of terminating the execution of the first operating system in the mobile device and executing the second operating system in the mobile device, and the notification further including the first and second amounts of time.

3. The computer system of claim 1, wherein the method further comprises:

determining, by the one or more processors, a time interval that is within a predefined amount of time of a current time;

determining, by the one or more processors, an application which is regularly executed in the time interval by a user of the mobile device;

receiving, by the one or more processors, first values indicating, while the mobile device executes the first operating system, a first rate of the application using the battery power of the mobile device, a first quality of the application being executed in the mobile device, a first performance of the application being executed in the mobile device, and a first utilization of resources of the mobile device other than the battery power;

receiving, by the one or more processors, second values indicating, while the mobile device executes the second operating system, a second rate of the application using the battery power of the mobile device, a second quality of the application being executed in the mobile device, a second performance of the application being executed in the mobile device, and a second utilization of resources of the mobile device other than the battery power; and based on the first and second values, generating, by the one or more processors a notification that includes a recommendation to perform the steps of terminating the execution of the first operating system in the mobile device and executing the second operating system in the mobile device.

4. The computer system of claim 3, further comprising:

multiplying, by the one or more processors, the first and second values by respective weights;

determining, by the one or more processors, a first sum of the first values multiplied by the weights;

determining, by the one or more processors, a second sum of the second values multiplied by the weights; and determining, by the one or more processors, the first sum is greater than the second sum, wherein the step of generating the notification is based in part on the first sum being greater than the second sum.

* * * * *